(12) United States Patent
Typinski et al.

(10) Patent No.: US 10,634,173 B2
(45) Date of Patent: Apr. 28, 2020

(54) FILTER BAND ASSEMBLY FOR SOLENOID-ACTUATED VALVE (71) Applicant: BORGWARNER INC., Auburn Hills, MI (US)

(72) Inventors: Ronald P. Typinski, Macomb, MI (US); Kevin Schneider, Ray, MI (US)

(73) Assignee: BorgWarner Inc., Auburn Hills, MI (US)

(*) Notice: Subject to any disclaimer, the term of this patent is extended or adjusted under 35 U.S.C. 154(b) by 81 days.

(21) Appl. No.: 15/707,341

(22) Filed: Sep. 18, 2017

(65) Prior Publication Data

US 2019/0085878 A1 Mar. 21, 2019

(51) Int. Cl.
| F15B 21/041 | (2019.01) |
| F16K 27/04 | (2006.01) |
| F16K 31/06 | (2006.01) |
| B01D 29/11 | (2006.01) |
| B01D 35/04 | (2006.01) |
| F16K 51/00 | (2006.01) |
| F16H 61/02 | (2006.01) |

(52) U.S. Cl.
CPC ......... *F15B 21/041* (2013.01); *B01D 29/112* (2013.01); *B01D 35/04* (2013.01); *F16K 27/041* (2013.01); *F16K 31/061* (2013.01); *F16K 31/0613* (2013.01); *F16K 51/00* (2013.01); *B01D 2201/4084* (2013.01); *F15B 2211/615* (2013.01); *F16H 2061/0258* (2013.01)

(58) Field of Classification Search
CPC ............. F15B 21/041; F15B 2211/615; F16K 31/061; F16K 31/0613; F16K 27/041; F16K 51/00; F16H 2061/0258; B01D 29/112; B01D 35/04; B01D 2201/4084
See application file for complete search history.

(56) References Cited

U.S. PATENT DOCUMENTS

| 3,002,532 A * | 10/1961 | Carlson ................. F16K 31/426 137/625.66 |
| 3,324,889 A * | 6/1967 | Batts ................... F16K 31/0606 137/625.65 |
| 6,517,718 B2 | 2/2003 | Gutierrez et al. |
| 2003/0006182 A1 | 1/2003 | Gutierrez et al. |
| 2015/0233480 A1 | 8/2015 | Rateike et al. |
| 2017/0356562 A1* | 12/2017 | Tewes ................... B01D 29/111 |

* cited by examiner

Primary Examiner — John Kim
(74) Attorney, Agent, or Firm — Howard & Howard Attorneys PLLC (57) ABSTRACT A filter band assembly for a solenoid-actuated valve includes a filter band adapted to be disposed about a valve body of the solenoid-actuated valve. The filter band has a first end at one end and a second end at another end. The filter band assembly also includes a separate bracket affixed to one of the first end and the second end and adapted to support the one of the first end and the second end on the valve body to allow the first end and the second end to be joined together in a closed position.

14 Claims, 6 Drawing Sheets

FILTER BAND ASSEMBLY FOR SOLENOID-ACTUATED VALVE

BACKGROUND OF INVENTION

1. Field of Invention

The present invention relates generally to solenoid-actuated valves and, more specifically, to a filter band assembly for a solenoid-actuated valve used in a transmission.

2. Description the Related Art

Conventional vehicles known in the art typically include an engine having a rotational output that provides a rotational input into a transmission such as an automatic transmission for a powertrain system of the vehicle. The transmission changes the rotational speed and torque generated by an output of the engine through a series of predetermined gearsets to transmit power to one or more wheels of the vehicle, whereby changing between the gearsets enables the vehicle to travel at different vehicle speeds for a given engine speed.

In addition to changing between the gearsets, the automatic transmission is also used to modulate engagement with the engine, whereby the transmission can selectively control engagement with the engine so as to facilitate vehicle operation. By way of example, torque translation between the engine and the automatic transmission is typically interrupted while the vehicle is parked or idling, or when the transmission changes between the gearsets. In conventional automatic transmissions, modulation is achieved via a hydrodynamic device such as a hydraulic torque converter. However, modern automatic transmissions may replace the torque converter with one or more electronically and/or hydraulically actuated clutches (sometimes referred to in the art as a "dual clutch" automatic transmission). Automatic transmissions are typically controlled using hydraulic fluid, and include a pump assembly, one or more hydraulic solenoid-actuated valves, and an electronic controller. The pump assembly provides a source of fluid power to the solenoid-actuated valves which, in turn, are actuated by the controller so as to selectively direct hydraulic fluid throughout the automatic transmission to control modulation of rotational torque generated by the output of the engine. The solenoid-actuated valves are also typically used to control hydraulic fluid for torque translation to change between the gearsets of the automatic transmission, and may also be used to control hydraulic fluid used to cool and/or lubricate various components of the transmission in operation.

The hydraulic portion of a solenoid-actuated valve has a sleeve or valve body with fluid ports for hydraulic fluid flow. The pressurized fluid flows in or out depending upon a position of a spool valve or valve member inside a bore of the valve body of the solenoid-actuated valve. During the fluid's course of flow, the fluid carries foreign particles along therewith, and those particles can greatly affect the movement/performance of the valve member if they are not filtered out before the fluid enters into a region of the valve member. Generally, screen filters are used in solenoid-actuated valves to keep the fluid cleaner from debris and those filters are installed around the fluid ports in the valve body and their open ends are locked with some kind of clasp. Further, a support feature is needed on the valve body of the solenoid-actuated valve for joining the open ends together. Thus, there is a need in the art to provide a filter band assembly for a solenoid-actuated valve that allows a filter band to be assembled in a valve body of the solenoid-actuated valve and eliminates a support feature on the valve body.

SUMMARY OF THE INVENTION

The present invention provides a filter band assembly for a solenoid-actuated valve including a filter band adapted to be disposed about a valve body of the solenoid-actuated valve. The filter band has a first end at one end and a second end at another end. The filter band assembly also includes a separate bracket affixed to one of the first end and the second end and adapted to support the one of the first end and the second end on the valve body to allow the first end and the second end to be joined together in a closed position.

One advantage of the present invention is that a filter band assembly is provided for a solenoid-actuated valve for use in an automatic transmission. Another advantage of the present invention is that the filter band assembly includes a bracket that allows the filter band to be assembled in a channel of a valve body of a solenoid-actuated valve by providing a support surface for the joining process. Yet another advantage of the present invention is that the filter band assembly includes a bracket affixed to one end of a filter band that eliminates the need for a support feature on the valve body. Still another advantage of the present invention is that the filter band assembly has a bracket with an internal channel that permits an uninterrupted flow path around the valve body.

Other objects, features, and advantages of the present invention will be readily appreciated as the same becomes better understood after reading the subsequent description taken in connection with the accompanying drawings.

DETAILED DESCRIPTION OF THE INVENTION

Figure 1:
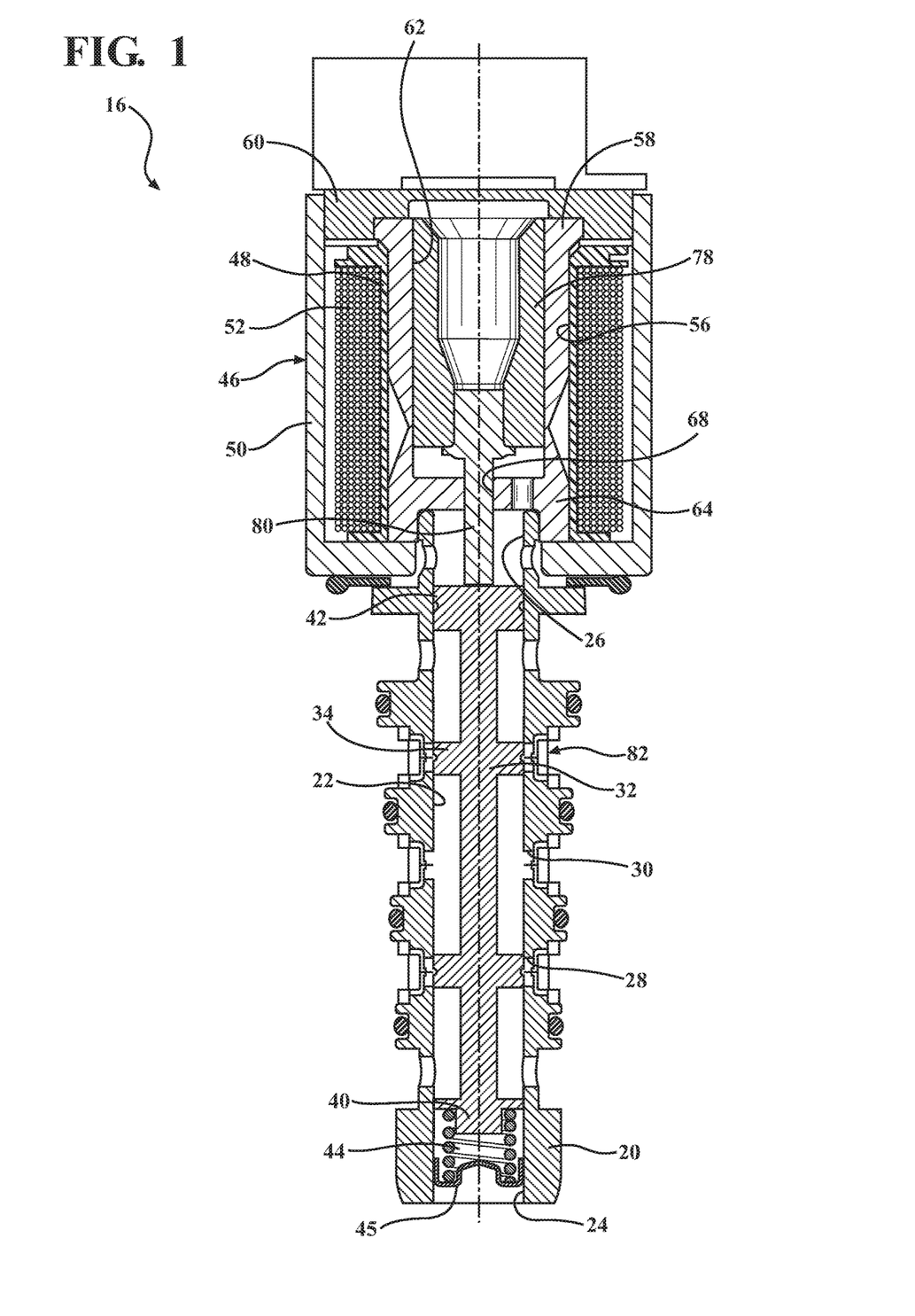
FIG. 1 is a cross-sectional view of one embodiment of a solenoid-actuated valve including a filter band assembly, according to the present invention.

Referring now to the figures, where like numerals are used to designate like structure unless otherwise indicated, one embodiment of a solenoid-actuated valve 16, according to the present invention, is shown in connection with a transmission (not shown) such as an automatic transmission of a vehicle (not shown). The solenoid-actuated valve 16 includes a valve body 20 having a valve bore 22. The valve bore 22 has a biasing end 24 and an actuating end 26. The valve body 20 also includes multiple fluid ports with at least one inlet port 28 and at least one outlet port 30 adapted to provide fluid communication with a source of pressurized hydraulic fluid (not shown) and a return to the source of pressurized hydraulic fluid such as a pump (not shown).

The solenoid-actuated valve 16 also includes a valve member 32 or a spool valve (i.e., hydraulic control valve) slideably disposed within the valve bore 22 of the valve body 20. The valve member 32 has a plurality of valve elements 34. The valve elements 34 are adapted to control the flow of pressurized hydraulic fluid between the ports 28,30 of the valve body 20. The valve member 32 further includes a biasing end 40 and an actuating end 42. It should be appreciated that the valve member 32 is integral, unitary, and one-piece.

The solenoid-actuated valve 16 further includes a biasing return spring 44 disposed in the valve bore 22 between the biasing end 40 of the valve member 42 and the biasing end 24 of the valve bore 22. The solenoid valve 16 includes an end member 45 disposed in the biasing end 24 of the valve bore 22. It should be appreciated that the end member 45 is fixed to the valve body 20 and the valve member 32 moves axially relative to the valve body 20.

The solenoid-actuated valve 16 also includes an electronically controlled solenoid, generally indicated at 46, for actuating the valve member 32 to control hydraulic fluid pressure between the inlet port 28 and the outlet port 30. The solenoid 46 includes an overmolded component such as a bobbin 48. The solenoid 46 also includes a can or housing 50 enclosing the bobbin 48. The bobbin 48 has a primary electromagnetic coil 52 wound thereon to create a magnetic field when energized. The solenoid 46 also includes a terminal (not shown) for connecting with the electromagnetic coil 52 and to ground (not shown). The coil 52 is made of copper wire. It should be appreciated that the terminal receives a continuous variable, digital control signal from a primary driver (not shown) such as an electronic controller (not shown).

Accordingly, the electromagnetic coil 52 is independently controlled by respective continuous variable, digital control signals from an electronic controller (not shown). The electronic controller is connected to a pair of contacts (not shown) of the terminal that is attached to the housing 50 of the solenoid 46. When engine conditions require clutching of the automatic transmission, the electronic controller inputs a control signal to the solenoid 46 via the contacts and the terminal. The electronic controller automatically controls actuation during automatic shifts. It should be appreciated that the electronic controller could also be used for the vehicle stopped on hills or the like. It should also be appreciated that the electronic controller can function to sense the occurrence of a manual shift and send a signal to the solenoid 46 for actuating the solenoid-actuated valve 16.

The solenoid 46 further includes an internal diameter or channel 56 extending through a longitudinal axis of the bobbin 48. The actuating end 26 of the valve body 20 is disposed in the channel 56. The solenoid 46 also includes a flux tube 58 co-axially disposed within the channel 56. The flux tube 58 is generally cylindrical in shape with a generally circular cross-section. The flux tube 58 may include an end 60 extending radially outward from one end thereof. The flux tube 58 has an aperture 62 extending axially therethrough. The solenoid 46 also includes a pole piece 64. The pole piece 64 is generally cylindrical in shape with a generally circular cross-section. The pole piece 64 may be integral with the flux tube 58. The pole piece 64 has an aperture 68 extending axially therethrough. The solenoid 46 further includes an armature 78 disposed in the aperture 62 of the flux tube 58 and an actuator rod 80 coupled to the armature 78 that extends through the aperture 68 in the pole piece 64. It should be appreciated that the armature 78 slides within the aperture 62 of the flux tube 58 and the actuator rod 80 slides co-axially with the pole piece 64.

Figure 2:
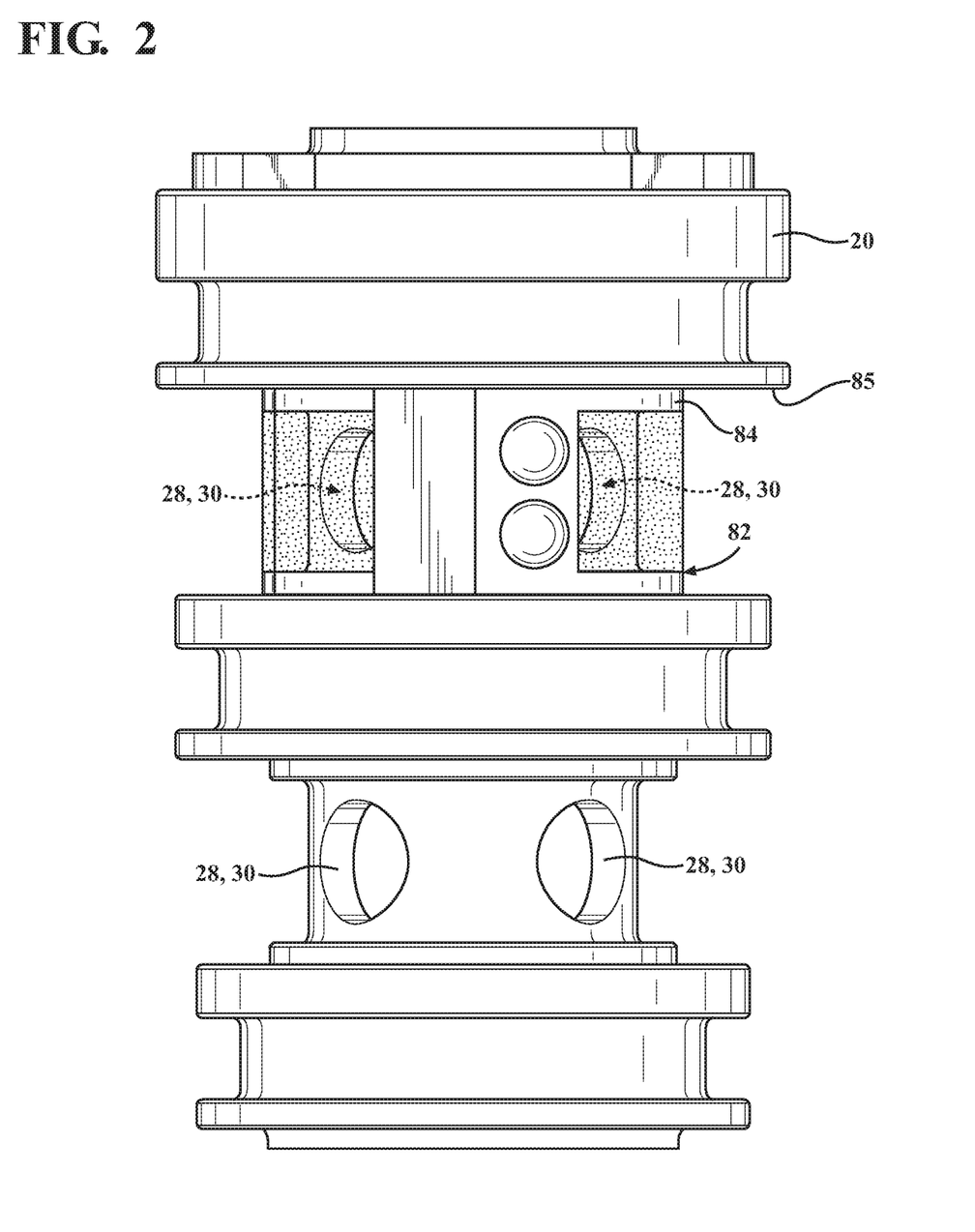
FIG. 2 is an enlarged elevational view of a portion the solenoid-actuated valve and the filter band assembly of FIG. 1.
Figures 3, 5:
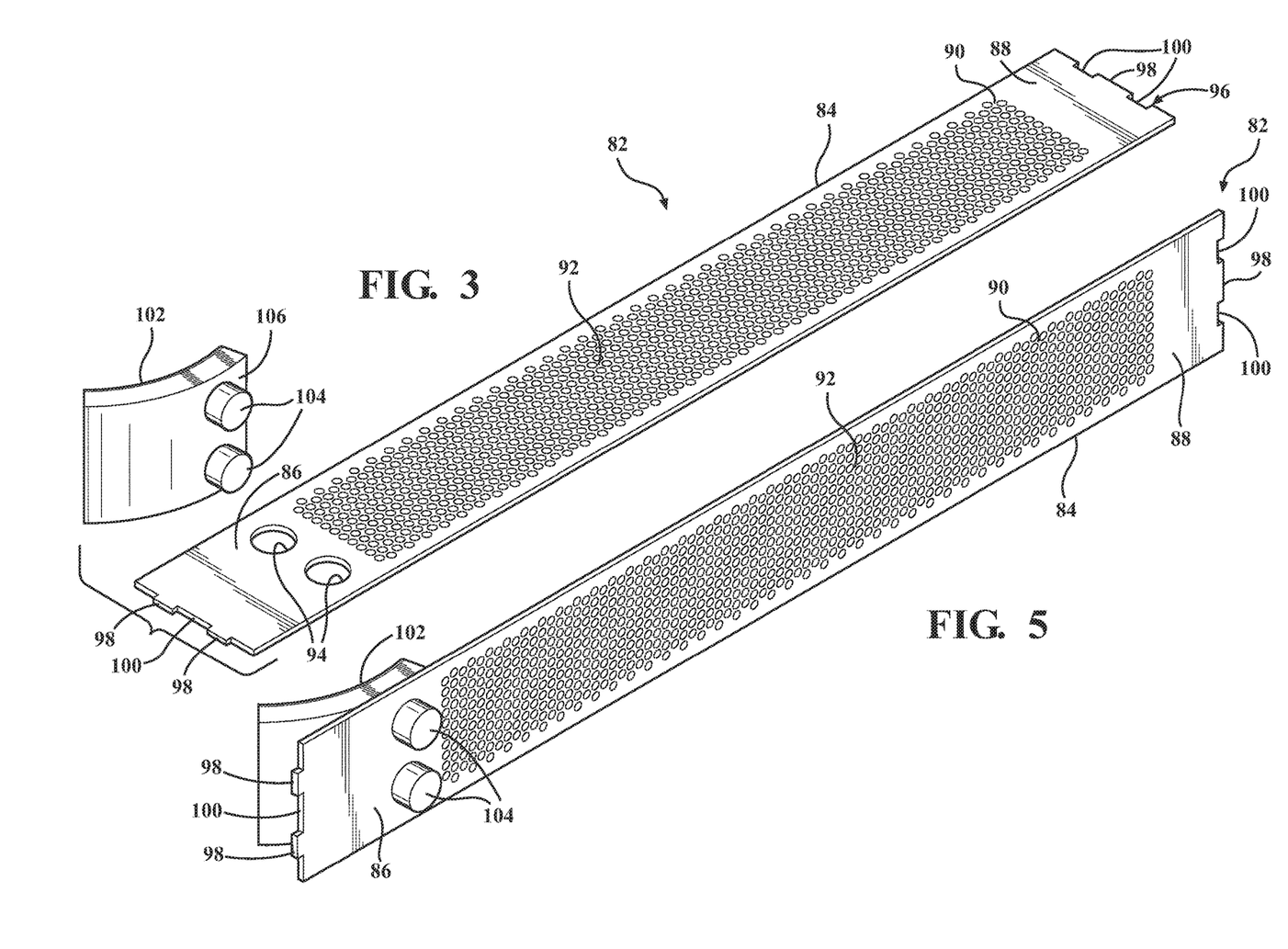
FIG. 3 is an exploded view of one embodiment of the filter band assembly of FIG. 2.
FIG. 5 is a perspective view of the filter band assembly of FIG. 3.
Figures 4A, 4B, 4C, 4D:
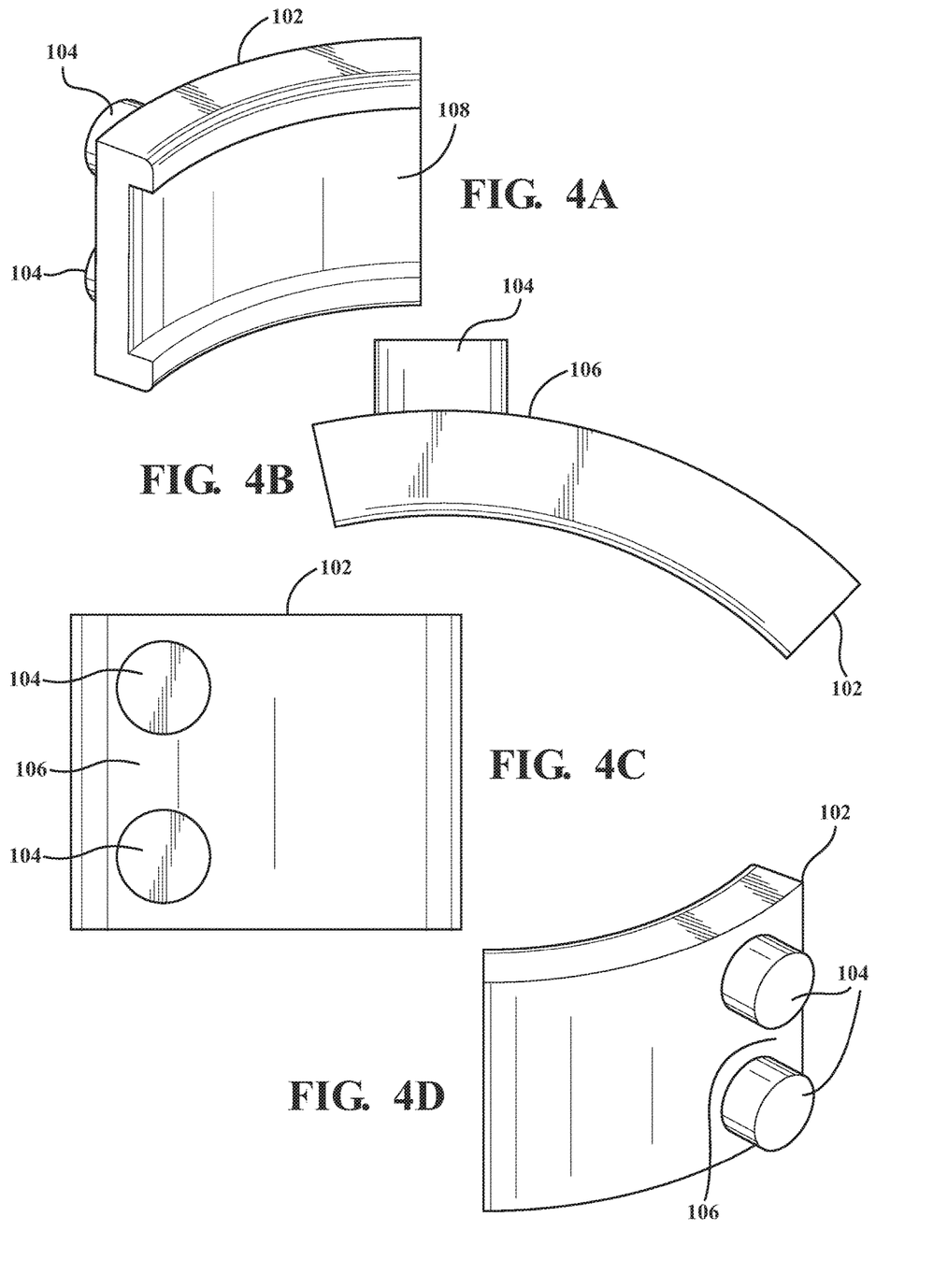
FIG. 4A is a perspective view of a bracket of the filter band assembly of FIG. 3.
FIG. 4B is an elevational view of the bracket of the filter band assembly of FIG. 3.
FIG. 4C is a plan view of the bracket of the filter band assembly of FIG. 3.
FIG. 4D is another perspective view of the bracket of the filter band assembly of FIG. 3.

Referring to FIGS. 1-3, the solenoid-actuated valve 16 includes at least one filter band assembly, generally indicated at 82 and according to the present invention, disposed about the ports 28, 30 of the valve body 20. In the embodiment illustrated in FIG. 1, a plurality, more specifically three, of the filter band assemblies 82 are disposed about the ports 28, 30 of the valve body 20. In one embodiment, the filter band assembly 82 includes a filter band 84 adapted to be disposed in a channel 85 and about opposed ports 28, 30 of the valve body 20. The filter band 84 extends axially in an open position and has a first end 86 at one end and a second end 88 at another end. The filter band 84 is formed as a flexible linear band having a generally rectangular shape, but may have any suitable shape. The filter band 84 is made of a polymer based material. In one embodiment, the polymer based material is a dimensionally stable plastic. The filter band 84 may be formed by injection molding. It should be appreciated that the filter band 84 has a relatively thin thickness to allow bending movement between the first end 86 and the second end 88.

Figures 6, 7:
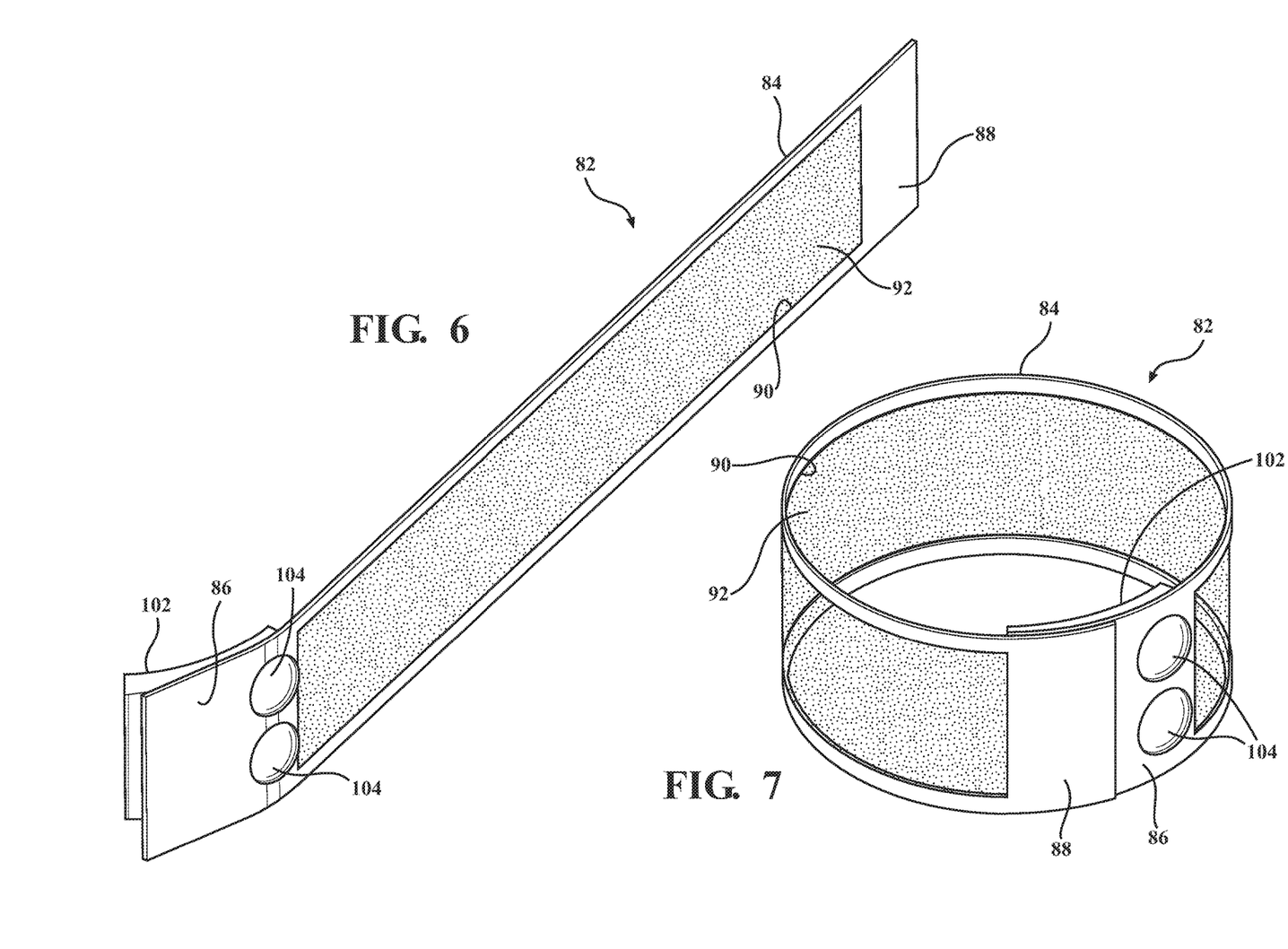
FIG. 6 is a perspective view of another embodiment of the filter band assembly of FIG. 2 illustrating an open position.
FIG. 7 is a perspective view of the filter band assembly of FIG. 2 illustrating a closed position.
Figure 8:
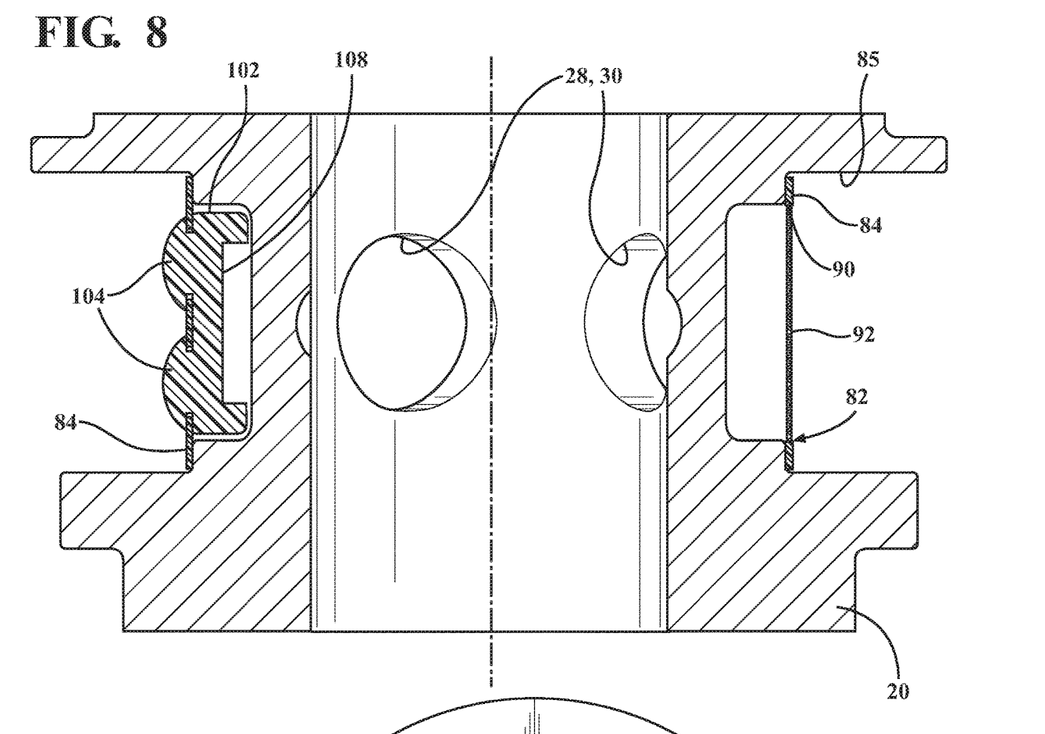
FIG. 8 is an enlarged sectional view of a portion of the solenoid-actuated valve and the filter band assembly of FIG. 1.
Figure 9:
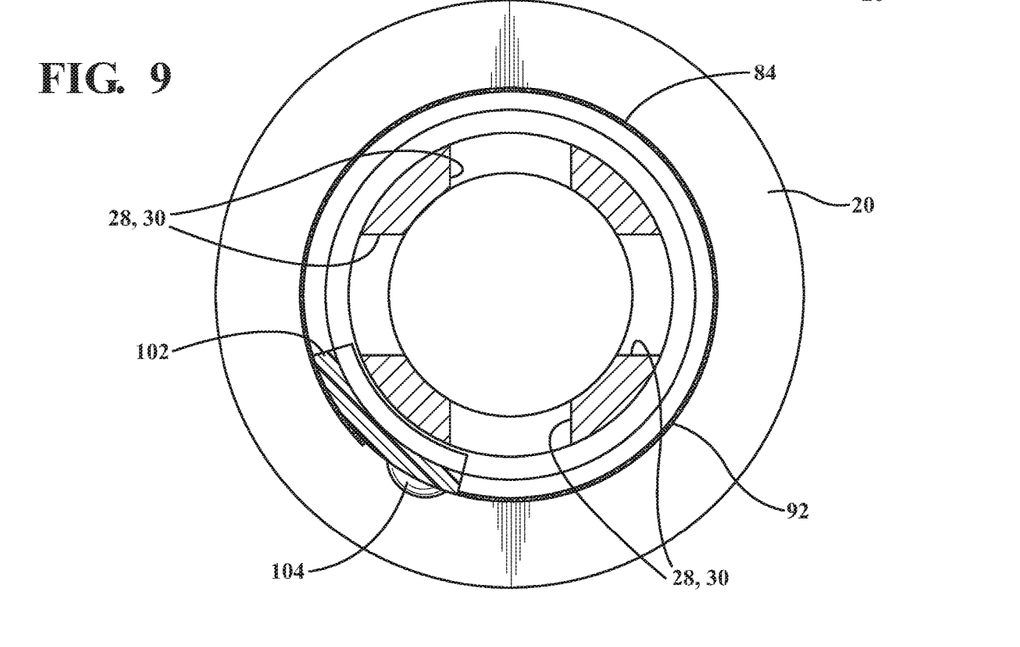
FIG. 9 is an enlarged plan view of a portion of the solenoid-actuated valve and the filter band assembly of FIG. 1.

The filter band assembly 82 also includes at least one filter aperture 90 extending transversely through and along the filter band 84. In one embodiment illustrated in FIGS. 3 and 5, the filter band 84 has a plurality of filter apertures 90 spaced between the first end 86 and the second end 88. The filter apertures 90 are of a predetermined size and are generally circular in shape, but may be any suitable shape to filter out debris from the fluid. In another embodiment illustrated in FIGS. 6 and 7, the filter band 84 has a single, continuous, filter aperture 90 extending between the first end 86 and the second end 88. In this embodiment, the filter aperture 90 is generally rectangular in shape, but may be any suitable shape. The filter band assembly 82 includes at least one filter 92 disposed in the at least one filter aperture 90. In one embodiment, the filter 92 is made of a filter material. In one embodiment, the filter material is a mesh of a predetermined screen size to filter debris from the fluid. The filter material may be secured to the filter band 84 by a suitable mechanism such as an adhesive or by molding of the material for the filter band 84. It should be appreciated that the filter material extends axially between the first end 86 and the second end 88.

The filter band assembly 82 also includes at least one aperture 94 extending radially through one of the first end 86 and the second end 88. In one embodiment, a plurality of, for example two, apertures 94 extend radially through the first end 86 and are spaced transversely. In one embodiment, the apertures 94 are generally circular in shape, but may be any suitable shape. The filter band assembly 82 includes a locking mechanism, generally indicated at 96, to lock the first end 86 and second end 88 together in a closed position. In one embodiment, the locking mechanism 96 includes at least one projection 98 extending outwardly from one of the first end 86 and the second end 88 and at least one recess 100 extending inwardly from the other one of the first end 86 and the second end 88. In one embodiment, a plurality, for example two, projections 98 and a plurality of recesses 100, for example two, are formed in the first end 86 and the second end 88. It should be appreciated that the projections 98 on the first end 86 are disposed in the recesses 100 on the second end 88 and the projections 98 on the second end 88 are disposed in the recesses 100 on the first end 86.

The filter band assembly 82 further includes a bracket 102 affixed to the filter band 82. The bracket 102 is a separate molded member. In one embodiment illustrated in FIGS. 4A-4D, the bracket 102 is generally arcuate and rectangular in shape. The bracket 102 includes at least one post 104 to pass through the at least one aperture 94 of the filter band 82. In one embodiment, a plurality of, for example two, posts 104 extend radially outward and are spaced transversely. The post 104 is generally cylindrical in shape with a circular cross-sectional shape, but may be any suitable shape. In one embodiment, the end of the posts 104 may be swaged or flattened over to form a semi-circular cross-sectional configuration to prevent the post 104 from exiting the apertures 94 of the filter band 84. It should be appreciated that the bracket 102 is affixed to the filter band 84 by swagging or flattening the end of the posts 104.

The bracket 102 also includes at least one support surface 106 to allow the first end 86 and the second end 88 to be joined together. The support surface 106 extends transversely and circumferentially and the posts 104 extend radially outwardly from the support surface 106. The bracket 102 includes at least one flow channel 108 extending therealong. In one embodiment, the flow channel 108 extends circumferentially and radially inwardly along a bottom of the bracket 102. It should be appreciated that the flow channel 108 allows fluid to flow between the bracket 102 and the valve body 20 when assembled.

The bracket 102 is made of a polymer based material. In one embodiment, the polymer based material is a dimensionally stable plastic. The bracket 102 may be formed by injection molding. It should be appreciated that the bracket 102 is a separate molded member affixed to the filter band 84.

In operation, the filter band assembly 82 is assembled by placing the posts 104 of the bracket 102 in the apertures 94 of the filter band 84 in an open position. The end of the posts 104 are swaged or flattened over to affix the bracket 102 to the filter band 84. The filter band 82 is placed in the channel 85 and over the valve body 20 such that the filter aperture 90 with the filter 92 is located or disposed over the ports 28, 30 in the valve body 20 as illustrated in FIGS. 1, 2, 8, and 9. The first end 86 and the second end 88 of the filter band 84 are moved toward each other. The projections 98 are disposed in the recesses 100 of the first end 86 and the second end 88 to lock the first end 86 and the second end 88 together in the closed position. It should be appreciated that the locking mechanism 96 may be unlocked to remove the filter band assembly 82 from the valve body 20 if desired.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the invention may be practiced other than as specifically described.

What is claimed is:

1. A filter band assembly for a solenoid-actuated valve, said filter band assembly comprising:
   a filter band adapted to be disposed about a valve body of the solenoid-actuated valve, said filter band having a first end at one end and a second end at another end; and
   a separate bracket affixed to one of said first end and said second end and adapted to support said one of said first end and said second end on the valve body to allow said first end and said second end to be joined together in a closed position.

2. A filter band assembly as set forth in claim 1 wherein said bracket includes a plurality of posts extending outwardly.

3. A filter band assembly as set forth in claim 2 wherein said filter band includes a plurality of apertures extending therethrough to receive said posts.

4. A filter band assembly as set forth in claim 1 wherein said bracket is generally arcuate in shape.

5. A filter band assembly as set forth in claim 4 wherein said bracket includes a support surface, said posts extending radially from said support surface.

6. A filter band assembly as set forth in claim 5 wherein said bracket includes at least one flow channel extending circumferentially therealong opposite said support surface.

7. A filter band assembly as set forth in claim 1 wherein said bracket includes a locking mechanism to lock said first end and said second end together.

8. A filter band assembly as set forth in claim 1 wherein said band includes at least one filter aperture.

9. A filter band assembly as set forth in claim 8 including a filter disposed in said at least one filter aperture.

10. A filter band assembly as set forth in claim 9 wherein said filter comprises a filter material.

11. A filter band assembly as set forth in claim 10 wherein said bracket is formed by injection molding.

12. A filter band assembly as set forth in claim 1 wherein said bracket is made of a polymer based material.

13. A filter band assembly for a solenoid-actuated valve, said filter band assembly comprising:
   a filter band adapted to be disposed about a valve body of the solenoid-actuated valve, said filter band including a first end at one end and a second end at another end, a plurality of apertures extending therethrough, and at least one filter aperture; and
   a separate bracket affixed to one of said first end and said second end and adapted to support said one of said first end and said second end on the valve body to allow said first end and said second end to be joined together in a closed position, said bracket being arcuate in shape and including a support surface, a plurality of posts extending radially outward from said support surface to be received in said apertures in a closed position, at least one flow channel extending circumferentially therealong opposite said support surface, and a locking mechanism to lock said first end and said second end together.

14. A solenoid-actuated valve comprising:
   a solenoid;
   a valve body connected to and operatively associated with said solenoid, said valve body having a valve bore extending axially and a plurality of fluid ports for fluid communication with said valve bore;
   a valve member axially and slidingly disposed within said valve bore; and a filter band assembly disposed about said ports of said valve body, said filter band assembly including a filter band having a first end at one end and a second end at another end and a separate bracket affixed to one of said first end and said second end to support said one of said first end and said second end on said valve body to allow said first end and said second end to be joined together in a closed position.

\* \* \* \* \*